Patented Dec. 26, 1950

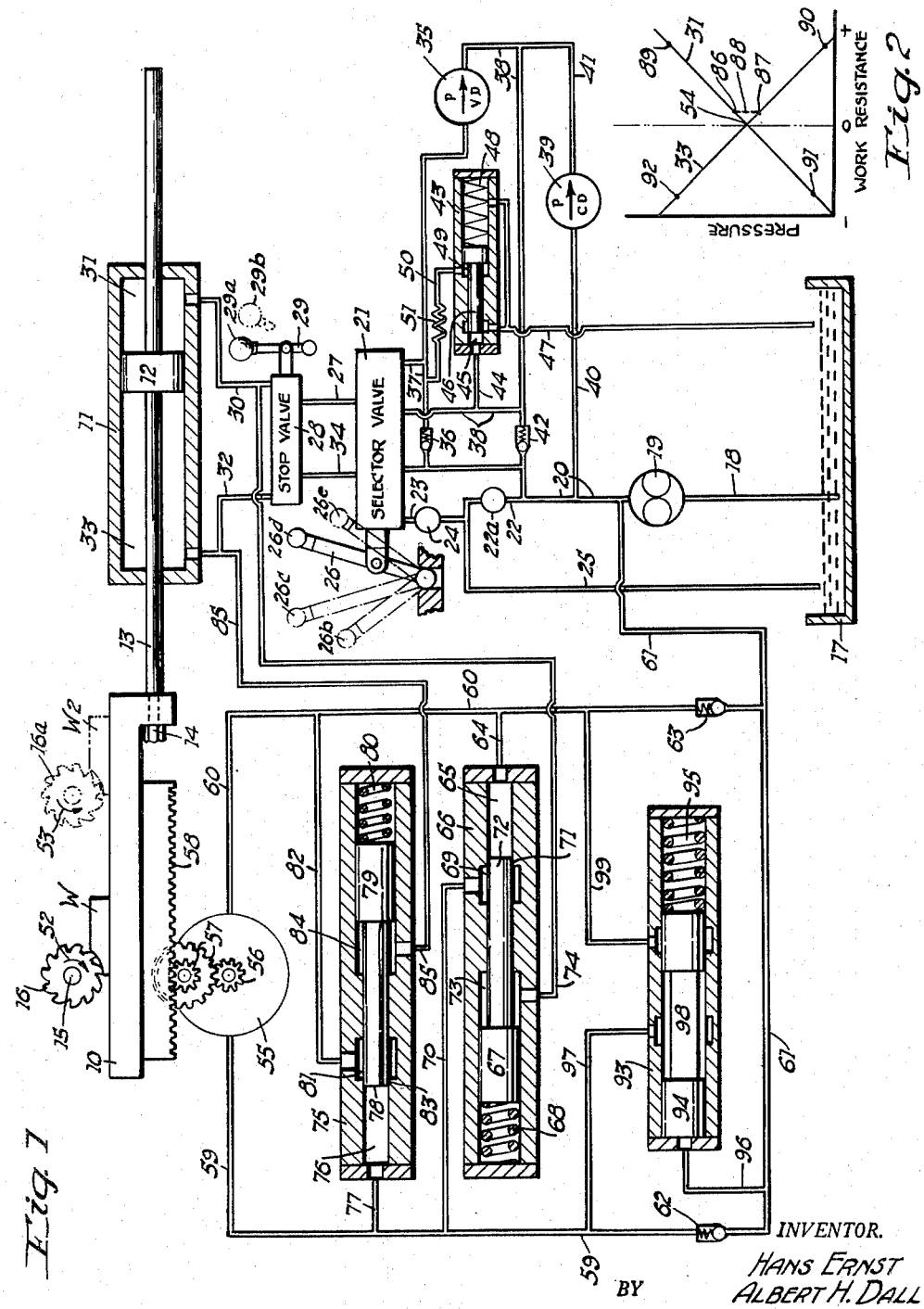

2,535,909

UNITED STATES PATENT OFFICE 2,535,909

HYDRAULIC TRANSMISSION

Hans Ernst and Albert H. Dall, Cincinnati, Ohio, assignors to The Cincinnati Milling Machine Co., Cincinnati, Ohio, a corporation of Ohio Application November 27, 1944, Serial No. 565,340

10 Claims. (Cl. 90—21.5)

This invention pertains to hydraulic transmission and control mechanism for machine tools, and is particularly related to hydraulic feeding mechanism for milling machines.

One of the objects of this invention is to provide an improved hydraulic transmission and control mechanism for a milling machine feeding mechanism.

Another object is to provide a feeding mechanism for a milling machine which is responsive and automatically compensative to variations in the cutting forces developed during the machining cycle.

Still another object is to provide a hydraulic feeding system for a milling machine capable of effecting a smooth, uniform feeding movement between work and tool despite fluctuations in the cutting forces during the machining operation.

A still further object is to provide a down cutting milling device in conjunction with a locked hydraulic feeding system of a milling machine which automatically opposes any irregular or pulsating action in the relative feeding movement of work and tool during the cutting operation.

And a still further object is to automatically maintain any desired adherence to uniformity in the rate of travel of a hydraulically actuated member under the influence of varying forces applied thereto.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 1 is a diagram including the hydraulic control circuit showing the application of the features of this invention to a milling machine hydraulic feeding system.

Figure 2 is a diagram illustrating the forward and back pressures in the hydraulic actuator for varying degrees of work resistance encountered during the cutting cycle.

In machine tools wherein a relative feeding movement of work and tool is to be effected, the work resistance due to the cutting action between the tool and the work surface reacts in rapidly varying amounts against the power being applied by the feed transmission. Because of this pulsating or intermittent variation in the opposing force of the cutting action there is difficulty in effecting a continuous smooth feeding movement between work and tool which is necessary to produce the desired high degree of finish on a work piece. Particularly is this problem present in hydraulic feeding systems wherein the hydraulic actuator comprises a fluid pressure motor or cylinder to move a work or tool holder in feeding motion.

This invention is particularly adapted to minimize and substantially eliminate the effect of the fluctuating work resistance on the desired smooth feeding motion to be effected in the work carrier or table 10, Figure 1, of a milling machine. This table 10 may be mounted for sliding feeding movement in any conventional manner on the milling machine frame. Preferably, a fluid pressure motor or actuator of the piston and cylinder type 11, having a piston 12 and a piston rod 13 rigidly attached to the table 10 by suitable means 14 is provided so that by reciprocating the piston 12 similar movements may be effected in the table 10. A suitable toolholder or rotary arbor 15 carried by the conventional milling machine spindle is also provided upon which may be mounted the cutting tool or milling cutter 16 for rotation thereby while a work piece W mounted on the work table 10 is fed relative to it by means of the actuating cylinder 11.

The piston 12 in the cylinder 11 is actuated by fluid pressure provided by a low pressure gear pump or rapid traverse pump 19 driven by a suitable prime mover (not shown). This pump 19 receives fluid through a suction line 18 from the fluid supply reservoir 17 and transmits fluid under pressure to a supply line 20 connected to a selector valve 21. A branch line 22 from the line 20 is connected to a relief valve 22a which, in turn, is connected to a drain line 25 for return of fluid to the reservoir 17.

The selector valve 21 may be of usual design and operated by a suitable control handle 26 operable to a feed left position 26b and a rapid traverse left position 26c, and to a feed right position 26d and a rapid traverse right position 26e. A stop valve 28 having a control lever 29 movable to a stop position 29a and to a run position 29b is provided to arrest movement of the work table 10. When the table is stopped, fluid pressure from the line 20 is connected through the selector valve 21, the line 23 to the low pressure relief valve 24 and returned to the reservoir 17 by the drain line 25 so that under these conditions the rapid traverse pump is discharging under very low idling pressure to thereby avoid unnecessary waste of power and heating of the hydraulic fluid.

When the selector valve is moved into the rapid traverse left position 26c for rapid movement of the work table 10, pressure from the rapid traverse pump 19 and the line 20 is cut off from the line 23 and the low pressure relief valve 24 and is then connected to the line 27 which, in turn, is connected to the stop valve 28. With the lever 29 of the stop valve in the run position 29b the line 27 will communicate with the line 30 connected to the chamber 31 of the main hydraulic actuating motor or cylinder 11. At the same time the line 32 connected to the chamber 33 of the cylinder 11 will be connected through the stop valve 28, the line 34, the selector valve 21, and the line 23, through the low pressure relief valve 24 to the drain line 25 for return of expelled fluid to the reservoir 17. Thus, under these conditions rapid application of fluid pressure up to the limit of the setting of the relief valve 22a may be utilized to actuate the piston 12 rapidly in the cylinder 11 for effecting rapid traverse movements to the left, Figure 1, in the work table 10. By moving the control lever 26 of the selector valve 21 to the rapid traverse right position 26e pressure from the line 20 will then be connected through the line 32 to cylinder 11, discharge from the cylinder taking place out through the line 30, the stop valve 28, the line 27, the selector valve 21, the line 23, low pressure relief valve 24, and line 25 to the reservoir 17. At any time, by moving the control lever 29 of the stop valve 28 to the stop position 29a, both of the lines 30 and 32 of the cylinder 11 may be blocked off to arrest motion of the piston 12.

Preferably, a locked hydraulic feeding system, such for example as that shown in Patent 2,019,486, issued November 5, 1935, is provided for the hydraulic or fluid pressure actuator motor which includes cylinder 11. This locked hydraulic feed circuit includes a variable delivery fluid pressure pump 35 receiving a supply of fluid from the line 20 through a check valve 36 and the line 37 connected to the intake of the pump. The pump discharges into the line 38 connected to the selector valve 21 so that when its lever 26 is moved to a feed forward position 26b, this line will be connected to the line 27, through the stop valve 28, to the line 30 to apply pressure in the chamber 31 of the cylinder 11. At the same time, discharge from the chamber 33 of the cylinder 11 will be connected through the line 32, stop valve 28, line 34, and the selector valve through line 37 to the intake side of the variable delivery pump 35 so that fluid is positively applied in the chamber 31 and positively withdrawn from the chamber 33 of the cylinder 11 so as to definitely control motion of the piston 12 by the relative displacement effected in the chambers of the cylinder by the pump 35.

A high pressure constant delivery booster pump 39 is utilized to keep the circuit interconnected between the variable delivery pump 35 and the chambers 31 and 33 of the cylinder 11 properly supplied with fluid at all times. This pump is connected to be supplied from the line 20 of the rapid traverse pump 19 through the line 40 and discharges into line 41 connected to the line 38 to in this way make up for any leakage which may occur in the feeding circuit. Fluid is also supplied to the line 38 directly from the gear pump line 20 through a check valve 42 to further assist in keeping this line charged with fluid at all times. It is to be noted that both of the check valves 36 and 42, however, prevent the high pressure ultimately developed by the variable delivery pump 35 in conjunction with the booster pump 39 from escaping back into the low pressure supply line 20. It is to be also noted that by moving the control lever 26 of the selector valve to the feed right position 26d the opposite direction of feeding to the right, Figure 1, will be effected in the piston 12 by connecting line 38 through the selector valve 21, to line 34, stop valve 28 and line 32 to the chamber 33 in the cylinder 11 while connecting the chamber 31 of the cylinder through line 30, stop valve 28, line 27, selector valve 21, and line 23, through the low pressure relief valve 24 to the line 25 for discharge into the reservoir 17.

In connection with this locked hydraulic feeding circuit there is provided a differential relief valve 43 for effecting a complementary pressure rise and fall in the chambers 31 and 33 of the actuating cylinder 11 in a manner as fully set forth and described in Patent 2,028,766, issued January 28, 1936. Pressure fluid from the line 38 from the variable delivery pump 35 is connected by a line 44 to a chamber 45 in the differential valve from where it may escape past the end of a spring-urged plunger 46 slidably mounted in the valve into a drain line 47 for return of fluid to reservoir 17. This plunger is urged in opposition to the pressure in the chamber 45 by a compression spring 48 so that as pressure increases in chamber 45 the plunger will be moved axially so as to compress the spring 48 and when pressure drops in the chamber 45 the plunger will be moved by the spring 48 to tend to close the escape of fluid from chamber 45 into the drain line 47 to thus maintain pressure in the lines 44 and 38. In addition to this pressure control there is also provided a second pressure chamber 49 behind the valve plunger 46 which is connected by line 50 through a fluid resistance 51 to the line 37 of the intake side of the variable delivery pump 35.

Pressure changes in the chamber 49 as effected by changes in pressure in the line 37 likewise operate in the same direction that pressure changes in the chamber 45 operate to oppose the spring 48. Thus, there is provided a dual pressure control for the plunger 46 both opposing the spring 48, one connected to the pressure line 38 and the other connected to the line 37 of the variable delivery pump 35. By appropriately proportioning the chambers 45 and 49 so that the respective areas of the plunger 46 in these chambers bear a predetermined desired relationship any degree of sensitiveness of control of complementary pressure fluctuations in both the lines 37 and 38 is obtained. In this way the sum of the forward and back pressures in the respective lines 38 and 37 will remain substantially constant. A rise in forward pressure will, therefore, be accompanied by a drop in the back pressure and vice versa.

When the control lever 26 is moved to a feed forward position 26b and pressure from the line 38 of the variable delivery pump 35 is connected to the chamber 31 of the cylinder 11 and discharge from chamber 33 is connected to the intake line 37 of the variable delivery pump, a pressure differential must exist between the chambers 31 and 33 to effect movement of the piston 12 to the left. Pressure in the chamber 31 must be in excess of that in the chamber 33 a sufficient amount to overcome the frictional forces of the sliding of the work table 10 on the milling machine structure when no cutting is taking place. Assuming the machine to be set up for a down cutting milling operation in which the cutter is rotating with its teeth engaging the work in the direction of feeding movement, as shown by the arrow 52 in Figure 1, it is apparent that the rotation of the cutter 16 will tend to draw or pull the work table 10 in the direction of feed and thereby tend to move the piston toward the chamber 33 and away from the chamber 31 with the result that pressure will build up in the chamber 33 and drop in the chamber 31. Obviously intermittent forces may develop between cutter and work under these conditions wherein the cutter at one time is assisting the work table as the teeth engage the work but wherein the work table must be moved solely by pressure in the chamber 31 when the tooth intermittently leaves the work W. There is, therefore, a constant change of pressure in the chamber 31 as the cutting cycle proceeds. In cases where down cutting milling is taking place usually the pressure in the chamber 33 will be relatively higher than under conditions where the table is being fed idly with no work in engagement with the cutter. Also, in the instance where normal upcut milling is to be undertaken, as shown at 16a and indicated by the arrow 53, the cutter has its teeth rotating in the opposite direction from that of the feeding motion of the table. In this case the pressure will be greater in the chamber 31 during the normal cutting operation whereas the pressure in the chamber 33 will be relatively lower.

The differential or complementary pressure conditions with respect to the cylinder chambers 31 and 33 of the cylinder 11 for different degrees of positive or negative work resistances is illustrated in the diagram Figure 2 where it can be seen that the pressures cross at a point 54 (neglecting friction of the table slide) where no cutting is taking place. When down cut milling takes place negative work resistance is encountered, i. e., work resistance assisting the feeding motion, pressure in chamber 31 drops below pressure in chamber 33. In up cut milling where the work resistance is opposed to the feeding motion the pressure in the chamber 31 will be greater than in the chamber 33. Any degree of variation of these pressures may rapidly take place in a pulsating fluctuating manner due to the intermittent action of the cutting teeth of the cutter and the vibratory frequencies of the machine structure, resulting in corresponding pressure changes in the chambers 31 and 33 of the cylinder 11.

It is these rapidly fluctuating pressure changes in the cylinder 11 which give rise to the undesirable uneven and irregular feeding movement of the work table 10. To eliminate this non-uniform motion of the work table 10 by the piston 12 the fluctuations in pressure in the chambers 31 and 33 are utilized to control or modulate a hydraulic opposer mechanism connected to the work table 10 in such a manner as to automatically oppose the irregular fluctuations or backlash movement set up in the table by the cutting action and thereby produce a smooth uniform feeding motion between work and tool.

These fluctuations in pressure in the chamber 31 and 33 are of rapid changing and minute character and are due largely to the compressibility of the relatively large volume of hydraulic fluid required in the cylinder 11. While the variable delivery pump together with the differential valve 43 is capable of maintaining constant volumetric withdrawal from the cylinder 11 uniform gravimetric withdrawal therefrom cannot be steadily maintained because of pressure fluctuations and the minute compressibility of the hydraulic fluid. To overcome this problem there is provided a hydraulically actuated mechanism for opposing these fluctuating feeding movements in which a minimum of hydraulic fluid is required in the opposing or compensating apparatus so that the compressibility of the fluid and its effect on the positive controlling function to be performed is reduced to a minimum. A hydraulic backlash opposer motor, such as the multiple cylinder rotary type pump or motor indicated generally at 55, is preferably used and may be suitably mounted on the milling machine frame. A mechanical transmission comprising the motor pinion 56 and the gearing 57 connected to a rack 58 fixed on the work table 10 positively connects the motor 55 to the work table. In this way reciprocation of the work table 10 by the cylinder 11 effects driving rotation of the hydraulic motor 55.

When feeding motion is taking place the hydraulic motor is driven to circulate fluid under pressure between the lines 59 and 60, each of which is supplied from the pressure line 20 of the rapid traverse pump 19 through a line 61 and the respective check valves 62 and 63 so as to maintain these lines at all times charged with fluid. A backlash modulating control valve 66 is provided having a pressure chamber 65 connected to the line 60 by means of a branch line 64 so as to apply fluid pressure from line 60 behind the plunger 67 of this valve. A compression spring 68 behind the other end of the plunger opposes the pressure in the chamber 65. A discharge passageway 69, connected to the line 59 by a branch line 70, has an edge 71 cooperating with the end 72 of the plunger 67 to form a variable fluid resistance to flow between the lines 64 and 70 in accordance with the axial position of the plunger. A second pressure chamber 73 is provided in the valve 66 operating against the plunger 67 to also oppose the compression spring 68 and is connected by a line 74 to the line 30 which is in communication with the chamber 31 of the cylinder 11.

A second backlash modulating valve 75 of the same construction as that of the valve 66 is provided for controlling feeding movements in the opposite direction. This valve 75 has a pressure chamber 76 connected by a line 77 to the line 59 so that pressure changes in the line 59 may react against the end 78 of the plunger 79 of the valve to oppose the compression spring 80 operating against the other end of the plunger. A discharge passageway 81, connected to the line 60 by branch line 82, has an edge 83 cooperating with the end 78 of the plunger 79 to form a variable fluid resistance to flow between the lines 77 and 82 in accordance with the axial position of the plunger 79. A second pressure chamber 84 is also provided in the valve 75 operating against the plunger 79 to also oppose the compression spring 80 and is connected by a line 85 to the line 32 which, in turn, is connected to the chamber 33 of the cylinder 11. These valves 66 and 75 provide fluid pressure control means reacting on the closed hydraulic circuit 59—60 of the opposer motor variably to determine its resistance to table movement.

When the table 10 is being fed to the left, Figure 1, by positioning the control lever 26 of the selector valve 21 in the position 26b, the hydraulic backlash opposer motor 55 is so arranged that fluid will enter the motor from the line 59 and be discharged out through the line 60. As the feeding initially takes place with the work not yet in contact with the cutter 16 there will exist a pressure in chamber 31 of the cylinder 11 as indicated at 86 in Figure 2 and a pressure in chamber 33 of the cylinder as indicated at 87, there being a small difference in pressure 88 which is required to overcome the friction of moving the work table 10 under idle conditions.

It is to be noted that the pressures 86 and 87 are of an intermediate amount so that an intermediate pressure is at this time being applied from the cylinder chamber 31 to the pressure chamber 73 of the modulating valve 66 and an intermediate pressure from the cylinder chamber 33 is being applied in the pressure chamber 84 of the other valve 75. These valves are so constructed that an intermediate pressure applied to the chambers 73 or 84 is insufficient to overcome the corresponding compression springs 68 and 80 sufficiently to permit flow of fluid past the corresponding ends 72 and 78 into the respective discharge openings 69 and 81 of the valves. In other words, if pressure is applied only to the chambers 73 or 84 no flow can take place between the respective lines 70 to 64 or 82 to 77.

When the hydraulic motor is being driven by the table feeding movement to the left pressure is being delivered into line 60 by the hydraulic motor 55 so that fluid pressure will increase in the pressure chamber 65 of the valve 66 which will assist the pressure already existing in the chamber 73 to move the plunger 67 axially to the left, Figure 1, so as to permit this fluid 65 to escape past the edge 71 into the chamber 69 and the line 70 to the return line 59 connected to the intake of the hydraulic motor 55. Under these conditions variation in pressure in the chamber 73 of valve 66 varies the resistance to flow of fluid between lines 64 and 70 by axially changing the position of the plunger 67 and opening between the edge 71 and the end 72 of the plunger, thereby similarly varying the opposing torque of the motor 55 reacting against the work table. The line 59 at this time being an intake line will have reduced pressure so that the pressure in the chamber 76 of the other valve 75 will be low with the result that the spring 80 will be able to move the plunger axially to the left, Figure 1, to close off the flow of fluid between the line 82 and the line 77 under these conditions. Thus, during normal feeding of the work table before the work has engaged the tool there will be a circulation of fluid from the line 60 through the valve 66 to the line 59 with a moderate back pressure being maintained in the line 60 by means of the spring 68 restricting the opening at the edge 71 in the valve 66.

In instances where normal upcut milling is to be done with the cutting action opposed to the feeding force, as the workpiece W2 engages the milling cutter 16a the cutting force will directly oppose the movement of the piston 12 to thereby increase pressure in chamber 31 while decreasing complementarily the pressure in the chamber 33 as indicated in Figure 2. There will then exist a pressure in chamber 31 at some point 89 and a pressure in chamber 33 at some point 90 indicated in Figure 2. Increase in pressure in the chamber 31 will be transmitted through the lines 39 and 74 to chamber 73 in valve 66 to move the plunger 67 to compress spring 68, decreasing the fluid resistance at the edge 71 in the valve to thereby decrease pressure in the line 60 and reduce the opposing torque of the hydraulic motor 55.

Variations in the cutting force which take place during the machining cycle may readily cause rapid pulsating changes in pressure in the cylinder 11 between the point 86 and 89, and 87 and 90, Figure 2, with the result that the work table due to the compressability of the fluid in the chambers 31 and 33 may not move uniformly and smoothly to effect the high degree of finish desired on the workpiece. This undersirable operation is automatically compensated for since any change in pressure in the chamber 31 is immediately reflected in the control chamber 73 and likewise in the relative positioning of the valve plunger 67 so as to automatically vary the resistance to flow between lines 64 and 70 to instantly oppositely vary the pressure in the line 60 and the effective torque of the motor 55 reacting on the work table 10. Thus, changes in the pressure in the actuating cylinder 11 are transmitted by means of the modulating valve 66 to cause complementarily varying degrees of opposing force to be transmitted by the hydraulic motor 55 directly to the work table. Whenever the pressure is suddenly released in the actuating cylinder by a cutting tooth leaving the workpiece momentarily, the hydraulic motor 55 at this time is immediately rendered effective to take up the force that was released by the cutter and to thereby maintain a uniform restricting force on the work table despite intermittent cutting action being applied by work and tool.

This arrangement is well adapted to instances where down cut milling is to be understaken. In down cut milling there is a rapid changeover of operating conditions for the work table from idle actuation to negative work resistance conditions as the cutter engages the work. This device is instantly responsive to these changes to provide a counter opposing force to the feeding movements as the cutter engages the work and automatically decreases this opposing force when the hooking-in action of the down cut milling operation decreases as idle cutting conditions are approached. As the work piece begins to engage the cutter during the machining operation the cutting forces tend to assist the feeding forces with the result that pressure will decrease in the chamber 31 and will increase in the chamber 33 of the cylinder 11. A pressure as indicated at some point 91, Figure 2, may develop in the chamber 31 while a pressure at some point 92 may develop in the chamber 33. It is to be noted that a decrease in pressure in the chamber 31 likewise decreases the pressure in the chamber 73 of valve 66 so as to permit the plunger under the action of the spring 68 to increase the resistance at the edge 71, thereby building up pressure in the line 60 to oppose rotation of the motor 55 and thereby cause the motor to maintain the necessary back pressure against the worktable in opposition to the varying cutting forces between work and tool. The valve 67 readily modulates or automatically adjusts itself rapidly back and forth in strict accordance with the changes in cutting forces developed by intermittent cutting action by the teeth on the work so as to maintain an effective uniform feeding motion by the cylinder 11. Thus, in this case of down milling, whenever the cutting forces tend to pull in the work to the cutter the pressure decrease in the chamber 31 of the cylinder 11 is utilized to automatically control the hydraulic motor 55 to instantly oppose the motion of the work table in proportion to the pulling-in action developed between cutter and work at this time.

When feeding motion is to be effected in the opposite direction as when positioning the control lever 26 of the valve 21 in the position 26d, the cylinder chamber 33 is then utilized to control the valve 75 through the pressure control chamber 84 to effect the modulated control of the hydraulic opposer motor 55 in the same fashion as that just described for the valve 66. The valve 66 under this latter condition of operation, of course, would be rendered inoperative by the reduced pressure in the chamber 73 so as to prevent flow of fluid from the line 70 to the line 64. In this latter case fluid will be discharged from the motor 55 into the line 59 and intake into the motor 55 will be received from the line 60.

In order to automatically permit a free movement of the work table 10 at any time at rapid traverse movements, there is provided a short circuiting or rapid traverse control valve 93 for the hydraulic opposer motor 55 having a control plunger 94 which is constantly urged in one direction by the compression spring 95 and which may be actuated in the other direction by fluid pressure from line 61 connected to actuate the plunger axially against the spring 95 by a line 96. When the control lever 26 of selector valve 21 is in a neutral position intermediate 26c and 26d only a low fluid pressure is applied to the line 61 and the line 96 from the rapid traverse pump 19 as determined by the setting of the low pressure relief valve 24. This relief valve 24 is set at a pressure which is insufficient to axially shift the plunger 94 of the short circuiting valve 93 against its spring 95. However, when the control lever 26 of the selector valve 21 is moved to either rapid traverse position 26c, or 26e, the higher pressure relief valve 22a is now effective to control the output pressure from the rapid traverse pump 19 so that a higher pressure now exists in the line 61 during rapid traversing of the piston 12 in the cylinder 11. This latter pressure as determined by the higher pressure relief valve 22a is sufficient to cause the plunger 94 of the short circuiting valve to be shifted against the spring 95 with the result that the line 59 is connected by means of the branch line 97 and the annular groove 98 of the valve plunger 94 to the branch line 99 which, in turn, is connected to the line 60 so there now is free, unrestricted flow between the lines 60 and 59 so that under rapid traverse conditions there is no restriction imposed upon the work table 10 by the opposer motor 55. This valve automatically cuts out the short circuit between the lines 59 and 60 of the motor 55 when either feed position or stop position is selected as the low pressure relief valve 24 is then operatively connected to reduce the pressure in line 61 and the branch line 96 to permit the plunger to return to the blocked-off position shown in Figure 1.

There has thus been provided in a hydraulic feeding system for a machine tool a hydraulic control and opposer mechanism which is readily sensitive to changes in the cutting forces applied to the feeding mechanism of the machine to maintain a smooth uniform relative feeding of work and tool.

What is claimed is:

1. In a milling machine having a work table, a cutter support associated with said work table, a hydraulic motor including a piston and cylinder for actuating said work table, a locked hydraulic feeding circuit connected to said cylinder at opposite sides of said piston to effect complementary pressure differences in said cylinder for effecting relative feeding movement in said work table, a separate hydraulic opposer motor, gearing interconnecting the motor and said work table whereby the motor is driven by movement of the table, a fluid circulating circuit connected to said motor, and a variable resistance means in said circuit reacting on the flow of fluid in said circuit when said motor is being driven by said work table, and pressure connections between the locked circuit and said variable resistance means whereby said means are controlled by variations in the fluid pressure in said actuating cylinder circuit.

2. In a hydraulic control and feeding mechanism for a milling machine having a work table, a cutter support associated therewith, and a hydraulic actuator for said work table including a cylinder, a piston connected to said work table, a locked hydraulic feeding circuit connected to said cylinder for effecting differential complementary pressures each side of said piston to cause feeding movements in said work table, a hydraulic opposer mechanically connected to said work table for actuation by movement of the table, and a modulating control valve hydraulically connected to said locked hydraulic feeding circuit, for regulating hydraulic flow through said opposer in response to changes in fluid pressure in said cylinder.

3. In a hydraulic control and feeding mechanism for a milling machine having a work table, a cutter support associated therewith, and a hydraulic actuator for said work table including a cylinder, a piston connected to said work table, a locked hydraulic feeding circuit connected to said cylinder for effecting differential complementary pressures each side of said piston to cause feeding movements in said work table, a hydraulic opposer mechanically connected to said work table for actuation thereby, a modulating control valve hydraulically connected to said locked hydraulic feeding circuit, for regulating hydraulic flow through said opposer in response to changes in fluid pressure in said cylinder, and common fluid pressure supply means for said locked hydraulic feeding circuit and said hydraulic opposer.

4. In a milling machine, a work table, a hydraulic cylinder for actuating said table in feeding movements, a locked hydraulic feeding circuit connected to said cylinder, a hydraulic opposer motor mechanically connected to be driven by the movement of said table, a fluid circulating opposer circuit connected to said opposer, a common fluid supply source for said locked hydraulic feeding circuit and said opposer circuit, and a control valve to vary the fluid pressure in said opposer circuit in accordance with variations in pressure supplied to said hydraulic cylinder when feeding said work table.

5. In a milling machine, a work table, a hydraulic cylinder for actuating said table in feeding movements, a locked hydraulic feeding circuit connected to said cylinder, a hydraulic opposer motor mechanically connected to be driven by the movement of said table, a fluid circulating opposer circuit connected to said opposer, a common fluid supply source for said locked hydraulic feeding circuit and said opposer circuit, a control valve to regulate flow in said opposer circuit in accordance with variations in pressure supplied to said hydraulic cylinder when feeding said work table, a rapid traverse control circuit connected to said cylinder to effect rapid traversing movements of said work table, and control means coupled with said opposer circuit to render said control valve therein inoperative when said work table is being actuated at rapid traverse movements.

6. In a milling machine having a work table, a hydraulic motor including a piston and cylinder for actuating said work table, a hydraulic opposer motor, a mechanical drive between said opposer motor and said work table, a hydraulic feeding circuit associated with said cylinder, a hydraulic opposer circuit associated with said opposer motor, a common source of fluid pressure supply for both of said circuits, and a variable hydraulic pressure control means in said opposer circuit actuated by changes in pressure in said feeding circuit during the feeding movement of said table to vary the reaction of the opposer motor against the table by way of the mechanical drive.

7. In a milling machine having a work table, a hydraulic motor for actuating said work table, a hydraulic opposer motor connected to said work table and actuable thereby, a hydraulic feeding circuit associated with said first motor, a hydraulic opposer circuit associated with said opposer motor, a common source of fluid pressure supply for both of said circuits, a variable flow control means in said opposer circuit actuable by changes in pressure in said feeding circuit during the feeding movement of said table, a hydraulic rapid traverse circuit connected to said cylinder, a selector valve for alternately rendering said feeding or rapid traverse circuits operative, and means to automatically render said flow control means ineffective when said rapid traverse circuit is operative.

8. In a milling machine having a work table, a hydraulic motor for actuating said work table including a cylinder and a piston movable therein, a locked hydraulic feeding circuit connected to supply fluid pressure to said cylinder for feeding in one direction or in the opposite direction, a hydraulic opposer motor mechanically connected to said work table for actuation thereby, a hydraulic fluid opposer circuit connected to said motor, a control valve in said opposer circuit controlled by variations in fluid pressure on one side of said piston to restrict flow of fluid in said opposer circuit when said table is feeding in one direction, a second control valve in said opposer circuit controlled by variations in fluid pressure on the other side of said piston to vary the rate of flow in said opposer circuit, said valves being connected in said opposer circuit so that one or the other of said valves are automatically rendered effective depending upon the direction of feeding of said work table.

9. In a milling machine having a work table, a hydraulic motor for actuating said work table including a cylinder and a piston movable therein, a locked hydraulic feeding circuit connected to supply fluid pressure to said cylinder for feeding the table in one direction or in the opposite direction, a hydraulic opposer motor mechanically connected to said work table for actuation thereby, a hydraulic fluid opposer circuit connected to said motor, a control valve in said opposer circuit controlled by variations in fluid pressure on one side of said piston to restrict flow of fluid in said opposer circuit when said table is feeding in one direction, a second control valve in said opposer circuit controlled by variations in fluid pressure on the other side of said piston to restrict flow of fluid in said opposer circuit when said table is feeding in the other direction, said valves being connected in said opposer circuit so that one or the other of said valves are automatically rendered effective depending upon the direction of feeding of said work table, a rapid traverse circuit associated with said hydraulic cylinder for effecting rapid movements of said work table in either direction, and a short circuiting valve coupled to the opposer circuit rendered operative by the application of rapid traverse pressure to said hydraulic cylinder to automatically render said modulating valves ineffective to restrict free flow of fluid in said opposer circuit.

10. In a milling machine having a frame, a work table reciprocable on said frame, a hydraulic cylinder on said frame for reciprocating said table, a hydraulic opposer motor on said frame connected to be driven by the movement of said table, a source of fluid pressure connected to operate said cylinder including a low pressure rapid traverse circuit and a high pressure locked feeding circuit and a selector valve to render one or the other of said circuits operative, an opposer circuit connected to said opposer motor, a pair of control valves in said opposer circuit each automatically rendered effective for one direction of feeding movement of said table variably to restrict rotation of said opposer motor in response to changes in fluid pressure in said feeding circuit, and means rendered effective by the operation of said selector valve when moved to render said rapid traverse circuit operative to automatically render said control valves ineffective to restrict free rotation of said opposer motor.

HANS ERNST.
ALBERT H. DALL.

REFERENCES CITED

The following references are of record in the file of this patent:

UNITED STATES PATENTS

| Number | Name | Date |
| --- | --- | --- |
| 1,978,350 | Martellotti | Oct. 23, 1934 |
| 1,996,466 | Ernst | Apr. 2, 1935 |
| 2,028,766 | Ernst et al. | Jan. 28, 1936 |
| 2,035,388 | Kearney | Mar. 24, 1936 |
| 2,216,550 | Ernst | Oct. 1, 1940 |
| 2,267,696 | Groene et al. | Dec. 23, 1941 |
| 2,309,637 | Fickett et al. | Feb. 2, 1943 |
| 2,363,706 | Svenson | Nov. 28, 1944 |
| 2,448,426 | Galloway | Aug. 31, 1948 |